H. P. L. LAUSSUCQ.
CONTROLLING MECHANISM FOR FLUID OPERATED TOOLS.
APPLICATION FILED MAR. 3, 1919.

1,435,138.

Patented Nov. 7, 1922.

Fig. 1.

INVENTOR
Henri P. L. Laussucq
BY
ATTORNEY.

Patented Nov. 7, 1922.

1,435,138

UNITED STATES PATENT OFFICE.

HENRI P. L. LAUSSUCQ, OF CAMDEN, NEW JERSEY, ASSIGNOR TO HEULINGS LIPPINCOTT AND ALFRED J. MAJOR, AS RECEIVERS OF CAMDEN IRON WORKS, OF CAMDEN, NEW JERSEY, A CORPORATION OF NEW JERSEY.

CONTROLLING MECHANISM FOR FLUID-OPERATED TOOLS.

Application filed March 3, 1919. Serial No. 280,445.

*To all whom it may concern:*

Be it known that I, HENRI P. L. LAUSSUCQ, a citizen of the United States, residing at 1426 Baird Ave., Camden, in the county of Camden and State of New Jersey, have invented a certain new and useful Controlling Mechanism for Fluid-Operated Tools, of which the following is a specification.

My invention relates to heavy hydraulic machinery and particularly to the automatic control of the movement of the operating parts of the tool by shutting off the supply of fluid at a predetermined or predeterminable point in the movement of the tool.

The purpose of my invention is to control the operation by means connected with the tool itself as distinguished from controlling it by moving parts carried by the intensifier or other fluid source of supply.

A further purpose is to apply the control by shutting off the pressure supply of an intensifier by the movement of parts carried by the machinery operated.

A further purpose is to make the control sensitive and quickly responsive by mounting the controlling mechanism upon the operating tool, eliminating the delay due to leakage between it and its source of fluid supply.

A further purpose is to make it possible to vary at will either the amount of tool movement required to shut off the fluid supply or the point at which this control shall begin or end or all of these.

A further purpose is to interpose a clutch between the control mechanism and the intensifier or other operating fluid supply and to apply the clutch to determine the point of the tool movement at which the tool control begins to be effective (i. e., the placing of the range of tool control). The clutch may be variously operated, fluid and electric controls, being the only ones shown.

A further purpose is to interpose a pair of connected arms, having both displacement and rocking movements, within the connections between the hand starting-lever and the fluid pressure inlet valve or switch for motor pump, giving the arms one character of movement by hand operation and the other character in a reverse direction by the tool-operated control.

A further purpose is to pump the fluid for tool operation by electric motor and to control the connections to the motor by movement of tool parts.

A further purpose is set the clutch for determining the point at which tool control begins by the same fluid as is used in the intensifier low pressure cylinder or by the current used for a motor-driven pump and coincidently with the application of the fluid to the intensifier or the current to the motor.

A further purpose in intensifier operation of fluid operated tools is to shut off the exhaust from the low pressure intensifier cylinder at a point short of the full stroke of the intensifier providing a cushion available at either the upper end or the lower end of the piston stroke or both and comparable in area of cushion surface with the full piston area.

Further purposes will appear in the specification and in the claims.

I have preferred to illustrate my invention by a few forms only, selecting forms which are practical, efficient, sensitive and thoroughly trustworthy and reliable and which at the same time well illustrate the principles of my invention.

In the drawings similar numerals indicate like parts.

I have discovered that much closer automatic "cut off" control and more reliable operation of fluid-operated high-pressure tools (ordinarily viewed as "hydraulic" machinery, and including shears, punches, forging and bending presses, and the like) can be obtained than have heretofore been possible by mounting the control mechanism directly within the range of movement of the tool itself so as to make it more sensitive and more quickly responsive to the tool operation, eliminating the loss of time and movement due to any leakage in fluid supply from the intensifier or other source controlled.

In application of this invention to different machine tools varying conditions are met. Shears and forging presses for example should be treated differently, setting the hand starting lever of the shears to different partial throws and uniform starting points whereas in the forging presses free movement is allowed at the start with high pressure under automatic control subsequently and a cut-off of the high pressure after die movement not in excess of that caused by the intensifier. Various other differences in desirable application of my invention to these several tools will appear from the description and discussion of the several figures.

Taking up first the shear construction shown in Figures 1–7:—

Figure 1:
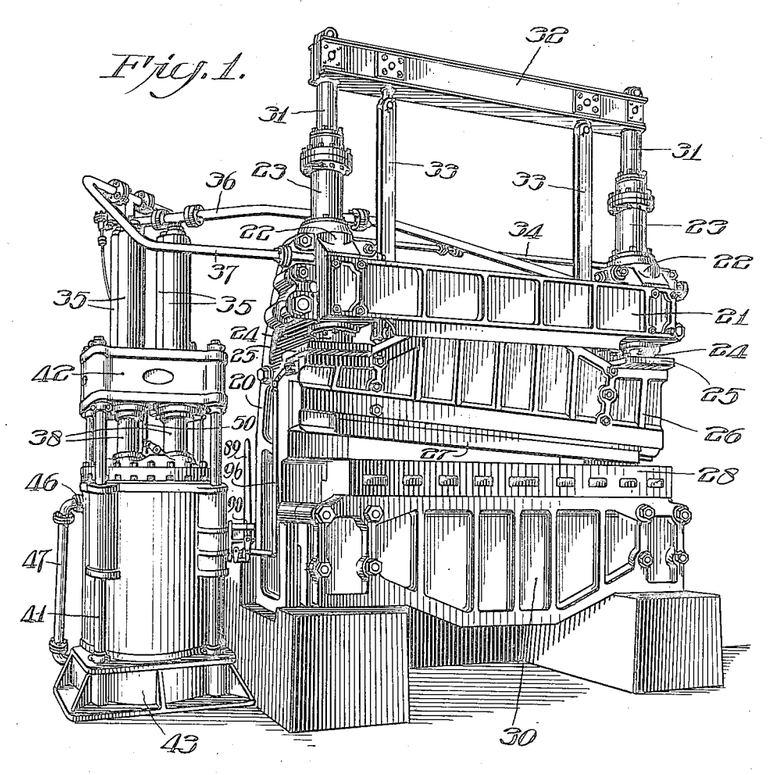
Figure 1 is a perspective view of a shear and of an intensifier for fluid supply therefor to which assembly my invention has been applied.
Figure 2:
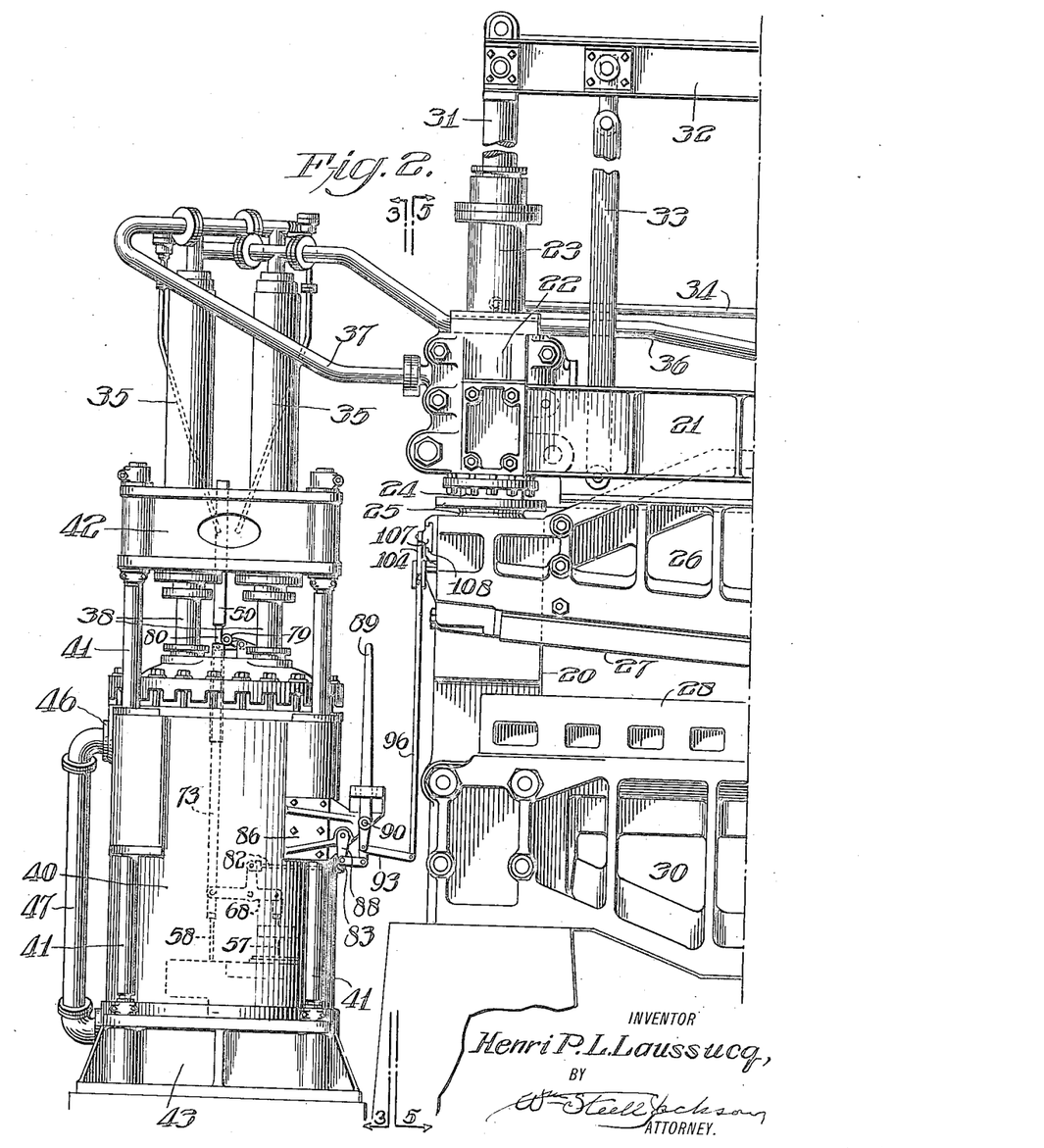
Figure 2 is a front elevation of the intensifier and of a portion of the shear shown in Figure 1.
Figure 3:
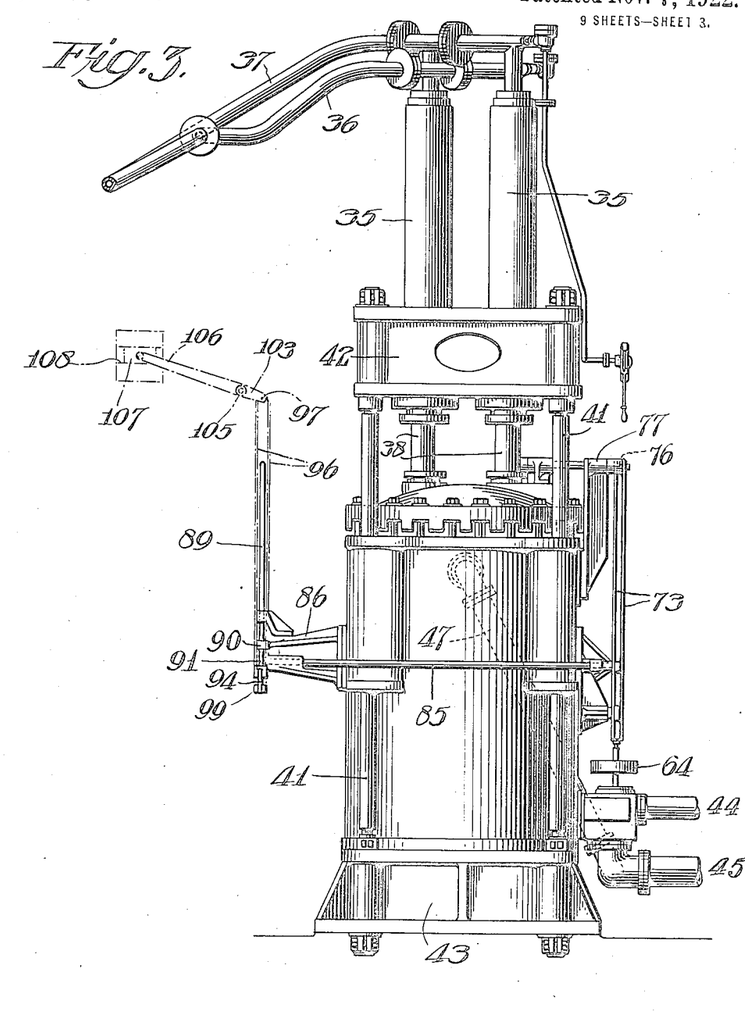
Figure 3 is a sectional side elevation of the structure seen in Figure 2, the section being taken upon lines 3—3 thereof.

The shear chosen for illustration comprises a frame 20 mounted upon any suitable foundations and connected at the top by tie beam 21. The frame supports high pressure cylinders 22 and pull-back cylinders 23. The rams 24 of the high pressure cylinder rest upon bearing plates 25, which transmit the load to top knife block or cross head 26 to which the top knife 27 is attached. The bottom knife block 28 terminates in the lower knife 29, adjustable upon a bottom beam receiving thrust 30.

The pull back cylinders 23 return the upper knife block 26 to its upper position through rams 31, cross head or beam 32 and links 33, connected with the block.

The pull back cylinders are usually supplied with fluid of constant pressure from an accumulator not shown by pipe connections 34.

The high pressure cylinders are supplied with motive fluid at equal rates from four high pressure intensifier cylinders 35 which are connected in diagonal pairs through pipes 36 and 37. The rams 38 for these high pressure intensifier cylinders are operated by a single piston 39 just as in the case of the single high pressure intensifier construction shown in Figure 8, the cylinder being shown at 40.

The construction is strengthened by rods 41 which connect entablature 42 to the base 43, reducing the stresses caused by vibrations.

The steam inlet for the cylinder is shown at 44, below, the level of the cylinder and the exhaust is shown at 45.

The upper part of the cylinder 40 is warmed during normal operation by exhaust steam entering at 46 through a pipe 47. This inlet for warming by exhaust steam is used also as an exhaust for the steam so admitted as well as for live steam which seeps past the piston rings during the upward movement of the piston, but is cut off when the ring 48 passes the edge 49 of this outlet. During the rest of the upward movement of the piston, the steam remaining in the upper part of the cylinder is compressed and forms a cushion the full diameter of the cylinder for retarding the piston movement. As an additional protection, the rod 50 is tappet-actuated by the piston against spring 51, to first open the exhaust at 45 from the main cylinder below the piston and subsequently to close the inlet of fluid thereto.

On the downward stroke of the piston, the exhaust opening 45 is cut off by ring 52 and the steam remaining beneath the piston is trapped within the lower part of the cylinder. The valve controlling the inlet will normally be closed preventing the steam from being driven back through it.

The value of this cushioning effect will be appreciated when it is understood that the inlet opening must be much smaller than the exhaust.

The structure as thus far described is old, with steam intensifier operation, except as to the cushioning provision for the upper and lower ends of the piston stroke in the intensifier main cylinder.

In mechanism of this character operated by an intensifier, pump or other source of fluid supply under high pressure, it is highly desirable to control the stroke of the fluid-operated (hydraulic) tool, whether it be a shear, press, punch, or of some other type, by controlling the inlet and exhaust of the low pressure cylinder in the case of the intensifier or the supply of high pressure fluid by which the tool is being operated. The control by shutting off the inlet of a low pressure intensifier cylinder so far embodies the principles applicable to the control of all fluid pressure supply to the tools that it is considered by me as a typical illustration and will be described by me with that understanding.

My automatic cut-off or stop mechanism is designed to cooperate with the hand-operated starting lever by which the low pressure intensifier inlet or other tool-operating fluid supply is applied in two ways; first, by making it possible to move the hand lever and have the working parts returned automatically to the same position, so far as the effect upon the valve is concerned, as before the hand lever was moved; second, in that, since the entire starting movement of the hand lever is compensated by the device to close the inlet automatically, a partial movement only of the hand lever requires but a proportional resetting or correcting movement of the automatic device and is corrected by but a partial stroke of the fluid-operated tool. This controls very exactly the extent of fluid-operated tool movement which takes places before it is stopped by the automatic cut-off or stop.

The intensifier inlet and outlet valves 53 and 54 as shown, are of a well known poppet form, being of the double-seated type to reduce lift. The valves 55 and 56 are lifted by means of rods 57 and 58 to clear the seats 59, 60, 61 and 62 for the purpose of affording inlet and exhaust as required. Both rods are adjustable to take up wear, as at 63.

The inlet valve 53 is weighted at 64 to insure closure against the pressure and to overcome packing friction. Its valve rod is adjustable to take care of wear, as stated, and, at the upper end, terminates in a pair of parallel links 66 which straddle the arm 67 of a system of rigidly connected arms 68 conveniently shown as a bell crank, adapted to rock about a shaft 69 supported in suitable bearings. The links are slotted at 70 to permit the arm to move downwardly without affecting the links but they are carried upwardly with the arm by means of pin 71.

A second arm 72 of this bell crank is connected by means of parallel links, 73 straddling the arm, to the rod 58 through pin 74 and slots 75 permitting downward movement of arm 72 without affecting the links but carrying them upward with upward movement of the arm.

The links 73 are extended upwardly and are connected at 76 to one arm of a pair of connected levers here shown as a bell crank having bearing 77. The other arm 78 of this bell crank carries a roller 79 which rests in a groove 80 in rod 50, whereby tappet actuation of rod 50 lifts the arm 78, lifting arm 76, link 73 and the exhaust valve 56. As will be seen, excessive lifting of the links will cause the lower walls of slot 75 to engage pin 74, turning the connected arms 67 and 72 to shut off the inlet valve.

The connected arms 67 and 72 are normally shifted through the arm 81 which is connected by a rod 82 with an arm 83 which, as will appear hereinafter, is controlled by a hand lever and is also automatically shifted. The arm 83 is one of a pair of arms forming a double rocker arm and rigidly connected by a shaft 85 having bearing in a bracket 86.

The use of two rocker arms instead of a bell crank here is to space the parts axially of the shaft 85. It is taken advantage of also to alter the leverage slightly using a shorter lever arm 88 at one end of the shaft than the arm 83 at the other. This is merely a matter of proportioning the parts in the design. As shown there is no angular spacing between arms 83 and 88.

The hand starting lever 89 is shown as pivoted at 90 in bracket 86. Its arm 91 is bifurcated and is connected at 92 with a lever 93 whose arm 94 is connected at 95 to links 96 swinging from pivot 97. Though the arm 91 and the links 96 are not the same length the arm 94 has a movement almost exclusively of translation when shifted by the hand lever, shifting the turned end 98 of the lever 93 with little angular movement. The lever 98 is connected by links 99 and pins 100, 101 with the arm 88; so that movement of the upper end of hand lever to the left in Figures 1, 6 or 8 will open the exhaust valve through lever 98, links 99, connected arms at 88 and 83, rod 82, and connections 68, 72 and 73.

Though the mechanism above represents only one form of mechanism and might itself be varied greatly, it might be well to point out here that except for convenience in placing of the parts, the arm 98, slightly lengthened, could be connected directly to rod 82.

Figures 4, 6, 7:
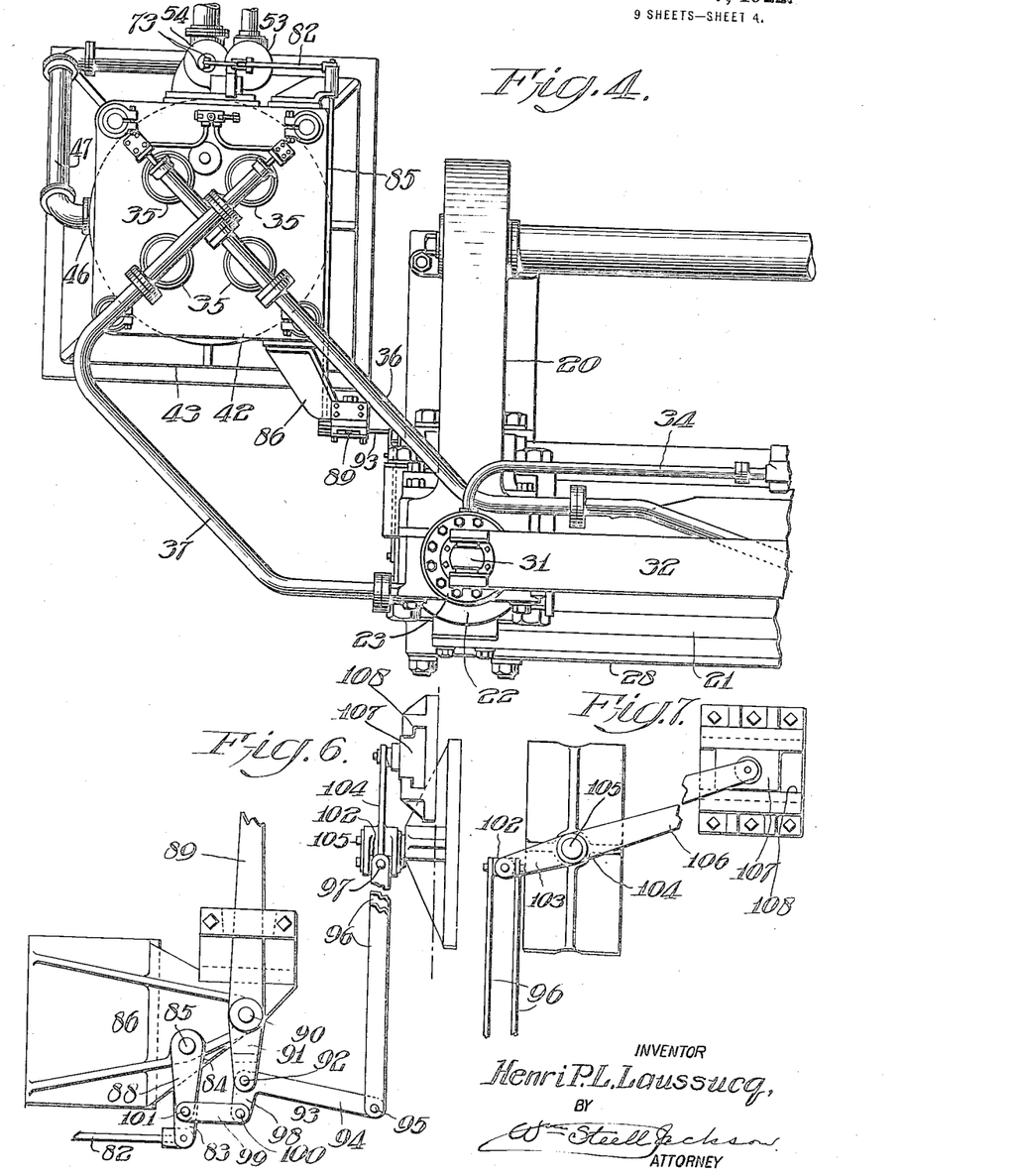
Figure 4 is a top plan view of the intensifier and part of the shear seen in Figure 1.
Figure 6 is a front elevation showing part of the tool-operated stop connections shown by me.
Figure 7 is a side elevation of part of the structure shown in Figure 6.
Figure 5:
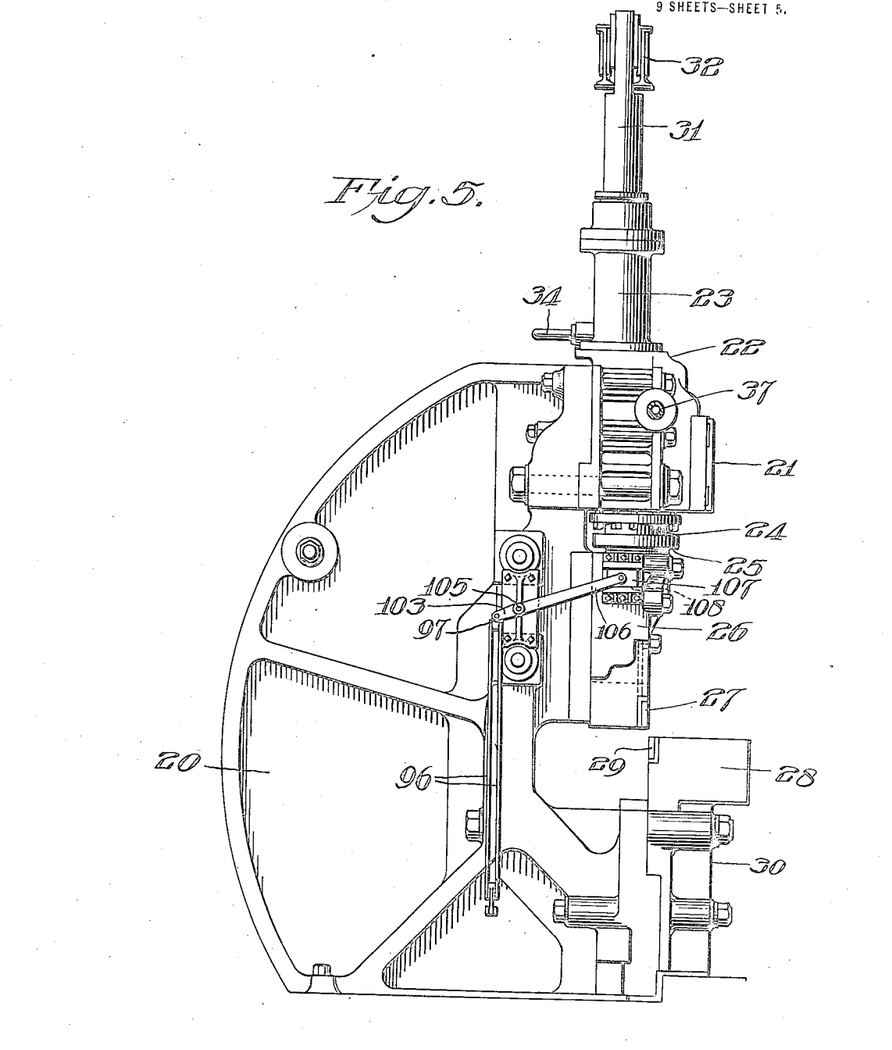
Figure 5 is a section and end elevation of the shear shown in Figure 2, the section being taken upon the line 5—5 thereof.
Figure 8:
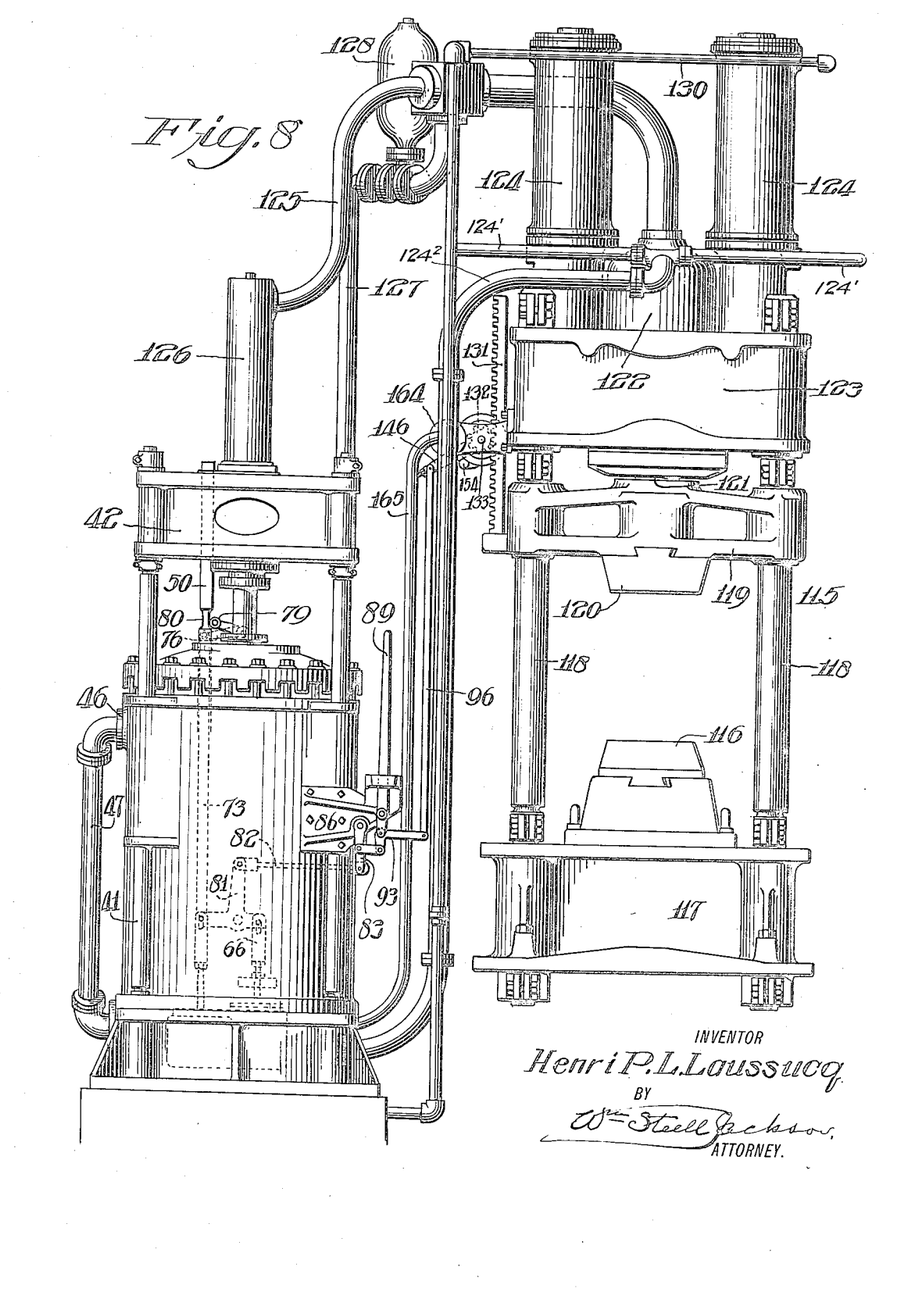
Figure 8 is a front elevation of a different form of intensifier operating a high speed forging press, another of many assemblages to which my invention may be applied.

From Figures 1, 6 and 8 it will be seen that valve opening movement of the hand lever 89 in a clockwise direction to shift the entire swinging lever 93 to the left (and hence to move pin 101 and link 99 to the left) can be neutralized to close the inlet valve without returning the lever 89 to its neutral position by rocking the lever 93 in a counter clockwise direction about pin 92 as a center so as to turn the pin 101 a corresponding distance to the right. This requires merely that links 96 be lifted; and if this be done automatically by a moving part of the hydraulic tool, the intensifier inlet is under automatic control from the tool. In the illustration the links 96 are pivoted through a compensating joint 102, allowing angular movement between in two planes, to the end 103 of a lever 104 which is pivoted at 105 in any suitable fixed member upon or in convenient range of the tool to be controlled.

The opposite end 106 of the lever 104 is pivotally connected with a part—here a block—107 carried by the movable part of the tool, in this case of the shear, by which the end 103 of lever 104 is shifted vertically to effect the control desired. Because of the arc movement of the end 106 of lever 104, some connection is desirable between it and the block 107 to permit the lateral movement resulting and I have shown a convenient means of providing for this by making the connection through block sliding within an undercut guide groove 108.

In operation, the hand lever is thrown to the right (in Figures 1, 2, 6 and 8) for admission of motive fluid to the low pressure intensifier cylinder the movement being the entire distance if it be desired to move the shear its entire working stroke. This condition will first be assumed.

The hand lever movement to the right will swing the lever 93 bodily to the left, causing movement of links 99, arms 83 and 88 and rod 82 in the same direction. This will rock the arms 67 and 72, lifting the weighted pressure valve stem 57 and opening the pressure inlet. This will cause upward movement of the intensifier piston and downward movement of the movable shear knife.

The downward movement of the arm 72 is accommodated by the slots in the links 73 (i. e.,) between it and the exhaust valve and does not affect the exhaust valve.

During the downward movement of the shear knife, the lever arm 104 is operated through the block 107 sliding in guide 108, with the result that the opposite end 103 of said lever is lifted, correspondingly lifting the rod links 96 and turning the longer arm 94 of the lever 93 upwardly about the pin 92. This throws the arm 98 of the lever 93 to the right in these figures, drawing the links 99 and, consequently, rod 82 to the right, (i. e., the reverse direction from their initial movement by the hand lever). The parts are so proportioned that this automatic return by movement of the shear head is sufficient to seat the inlet valve and shut off fluid admission to the low pressure intensifier cylinder, stopping the intensifier and consequently stopping the working stroke of the shear.

In case of sudden rupture of the work, the intensifier piston can jump further, and a slight additional permissible movement of the shear blade is provided to accommodate this. It will be seen that the additional shear movement will cause still further lifting of the links 96, with consequent further retraction of the link 99 and rod 82, so that the arms at 68 are moved beyond the point of merely seating the inlet valve and, after taking up the play provided by slots 75, lifts the exhaust valve, relieving the pressure in the low pressure intensifier cylinder. The weight of the intensifier piston and high pressure ram and the pull back pressure acting upon the shear then together return the intensifier and shear to their initial or "set" positions.

If the hand lever be not replaced to neutral position, the lowering of the links 96, by reason of upward movement of the shear parts will result in a slight inlet of steam to the intensifier, just sufficient to balance the weight of the parts and the pull of the pull back.

On the other hand, after the hand lever has been returned to neutral position, if it be moved to the right (in these figures) a part only of its possible stroke, it will be obvious that the links 99 and rod 82 will be moved but part of the full distance, resulting in a partial lifting only of the inlet valve.

Figures 10, 11:
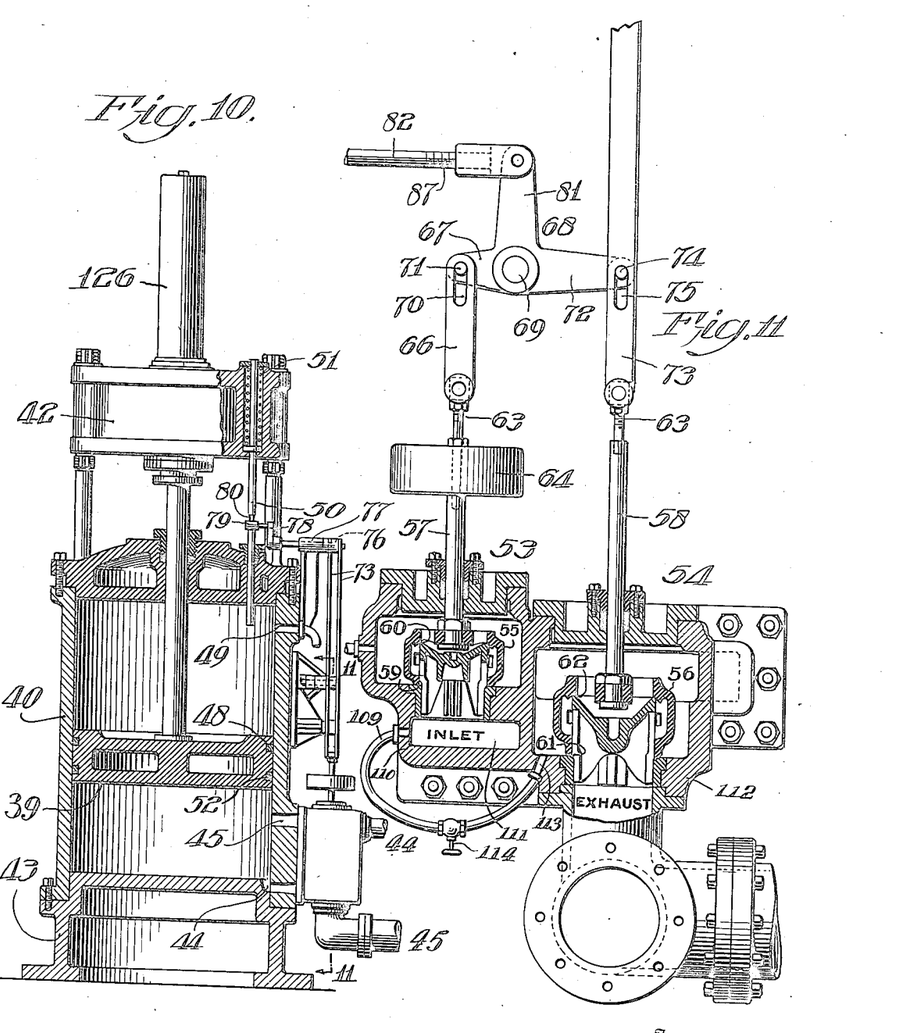
Figure 10 is a vertical section, partly in elevation, of an intensifier cylinder and connections disclosed by me.
Figure 11 is a section and partial elevation of the intensifier valves and immediate connections, the view being on a larger scale than in some of the other views.

With the hand lever in starting position (at the right) and the shear head down, having just closed the inlet valve by rocking movement of the swinging lever 93, it will be noted that replacing movement of the hand lever to neutral position will have the effect of throwing the arms at 68 still further in the same direction (counter clockwise in Figure 11) as it was thrown automatically because of movement of the shear head. This additional rocking of the arms at 68 will open the exhaust of the intensifier cylinder and speed the return (non-working) stroke of the shear.

As plenty of steam inlet is provided by the valve even with partial opening of the inlet, partial movement of the hand lever does not affect the speed of operation. However, it will be noted that the links 99 and rod 82 have moved a shorter distance than before and need not be returned further than they have been moved, in order to close the inlet valve. Consequently, a correspondingly smaller movement of the links 96 will close the inlet valve and this smaller movement is obtained by a partial (proportional) smaller operating movement of the shear. In this way, any intended proportion of the stroke of the shear can be obtained with the full advantage of the automatic cutoff at the end of the (partial) stroke.

Notwithstanding that in some forms of my invention I provide other means by which the extent of stroke can be varied, it is still true that these other mechanisms can be varied in their stroke by the same means as hereinbefore pointed out, of partial movement of the hand starting-lever.

As has been pointed out, the device would come to rest with just sufficient steam in the intensifier low pressure cylinder to balance the weight of the parts and the pull of the pull back. Even this quantity of steam within the intensifier cylinder can be exhausted by throwing the hand lever over to the left in Figures 1, 2, 6 and 8, which is effective to swing the lever 93, links 99 and rod 82 to the right, turning the arms at 68 in clockwise direction in Figure 8 (counter-clockwise in Figure 11), lifting arm 72 and opening the exhaust without affecting the inlet valve.

The exhaust position of the hand lever, to the left of neutral in Figures 1, 2, 6 and 8, is also used to increase the speed of the shear operation by more quickly relieving the steam pressure in the intensifier cylinder and thereby increasing the speed of the back stroke. Its operation for this purpose is similar to that for relieving the pressure beneath the piston, as previously described.

In Figure 8, I have shown my invention applied to a hydraulic forging press 115 in which the anvil is shown at 116 upon base 117 and the upper structure is carried by tension bolts or columns 118. These bolts serve also as guides for the movable cross head 119 carrying the die 120. The cross head and die are driven by a plunger 121 operating in a cylinder 122 mounted upon an entablature 123. The pull back construction is shown at 124 and is operated by a separate valve, not shown, through connecting pipes 124', 124², as is well known in the art. The high pressure operating connections comprise intensifier connection 125 from an intensifier having but a single high pressure cylinder, 126. The pressure cylinder is filled, during the non-working part of its stroke, from tanks 129 through pipe 127. This supply is cushioned by air vessel 128. A drain is shown at 130.

As the stroke of this press is divided into two parts, the first by gravity, with a fluid filling behind the piston preliminary to the application of pressure (old in the art and therefore not herein illustrated and described in detail) and the remainder of the stroke under pressure by reason of the discharge of the content of accumulator pressure from cylinder 126 into the cylinder of the press, it is desirable that the cut-off mechanism shall not be "set" for engagement by moving parts of the press until the forging pressure is applied to the cylinder of the press.

In order to accomplish this to the best advantage I have found it better to rotate a clutch member from the tool head and engage this member with the cut-off connections when the intensifier pressure is applied. Describing the mechanism shown for this purpose:—

Upon the side of the cross head, and movable lengthwise with the head, is mounted a rack 131 which is the operating member by which rotation of the loose clutch member is secured. As with much if not all of the mechanism illustrated in this application it is only one form of many which, in view of my disclosure, will suggest themselves to the designer.

The rack meshes with and positively rotates a pinion 132 keyed to shaft 133 and having bearing on opposite sides of the pinion in standards 134, 134' of a bracket 135. The rack is supported at its back by brace 136 extending between the standards.

As thus far described, it will be evident that the pinion 132 and hence the shaft 133 will rotate continuously in one direction or the other during all movement of the cross head 119. In order to apply this movement usefully to operation of a cut-off beginning to operate at a predetermined time, I interpose between the shaft and any suitable cut-off connections (such, for example, as those shown in the previous figures), a clutch construction which can be set either by fluid pressure, which may be the operating pressure, by electromagnetic action or by any other means desired. When so set the connections complete the cut-off within a predetermined range of tool movement, corresponding generally with the cut-off operating movement of the shear.

Figure 12:
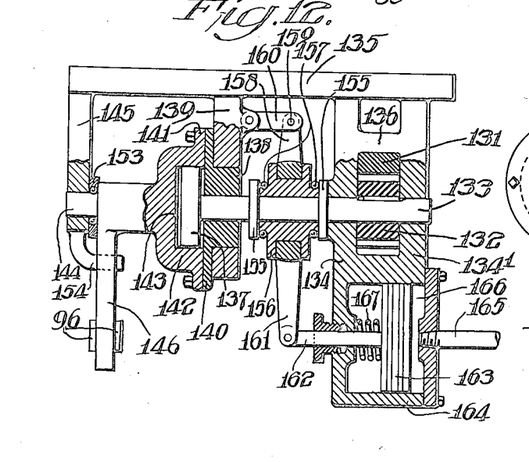
Figure 12 is a vertical longitudinal section of a clutch used by me.
Figure 14:
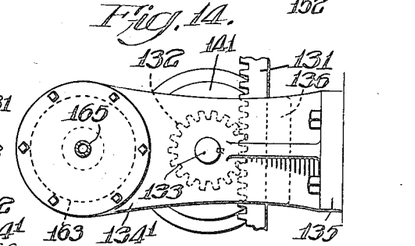

Describing the form of clutch shown in Figure 12:—the shaft 133 is continued to carry a loose clutch member 137 and is given bearing near the clutch face within an annulus 138, itself having bearing and rotatable within a standard 139 forming part of bracket 135.

The annulus 138 is flanged at 140 and this flange is secured to a flange 141 forming the outer part of a cup 142 whose bottom face 143 cooperates as a tight clutch member with the loose clutch member 137. The stem of the cup 142 is extended axially to a bearing 144 in an end standard 145. Between the tight clutch face 143 and the bearing, the clutch stem is provided with a rigid lever arm 146 corresponding in purpose and function after the clutch is set with the arm 103 in Figure 7, in that it may be used to lift and lower or otherwise shift parts of a train of connections through which the cut-off is effected.

Figures 9, 13:
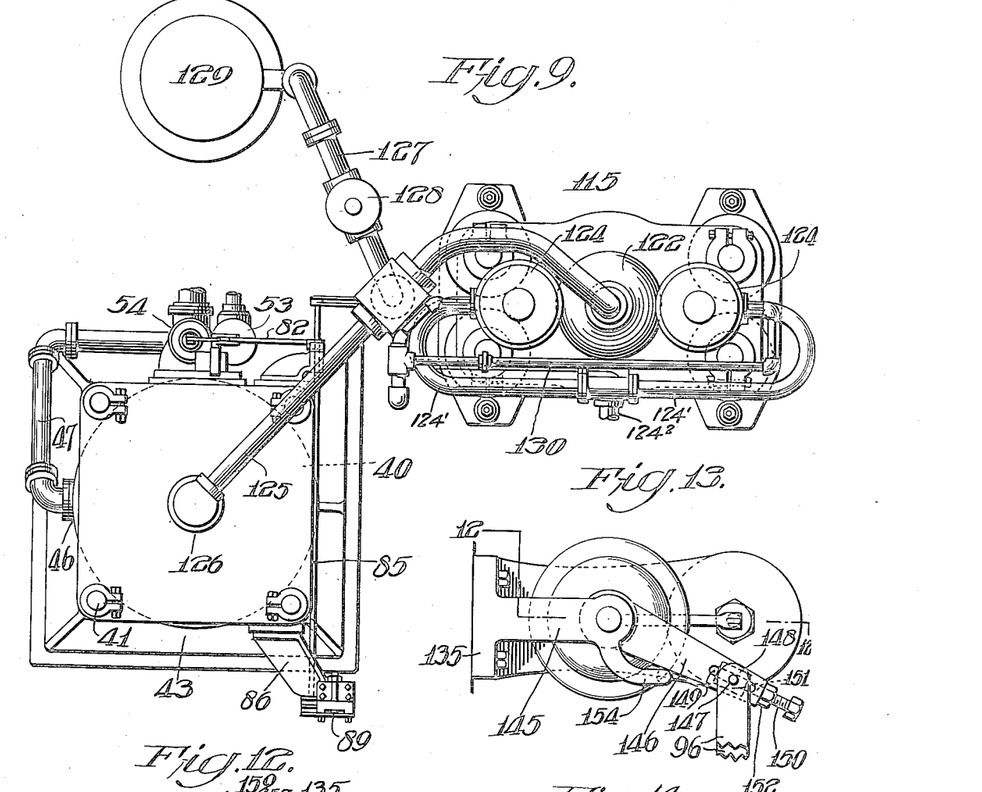
Figure 9 is a top plan view of a construction of the type shown in Figure 8, a filling system being also shown.
Figures 13 and 14 are opposite end elevations of a clutch used by me.

Links 96 are shown as connected with this arm in Figures 12 and 13 and in Figure 13 an adjustment of the length of radius for operation of these links is shown. Here the pin 147 for the links 96 is mounted in a block 148, whose position within a slot 149 is determined by a bolt 150 threaded into the end of the arm at 151 and locked by nut 152.

Thrust pressure upon the cup is taken care of by a thrust bearing 153 and the arm 146 is supported against excessive lowering movement by a stop 154.

In order to control this clutch so as to "set" the clutch at a predetermined time, preferably coincident with application of pressure to the press, the shaft 133 is given longitudinal play and is provided with collars 155 between which is mounted a spool 156. Ball bearings are shown at 157 on each side of the spool.

The spool is moved to throw the shaft 133 and set or release the clutch by means of a yoke 158 pivoted at 159 in links 160 supported upon the bracket and having the free end 161 of the yoke under control of a cylinder or other operating mechanism capable of being actuated from a distance.

In the form shown in Figure 12, fluid operation is indicated and the free end of the yoke is connected through a rod 162 with a piston 163 in a cylinder 164. The piston is operated in one direction by fluid pressure admitted through pipe 165 to space 166 and is retracted by the spring 167.

The piston and rod are packed in any suitable manner.

Figure 15:
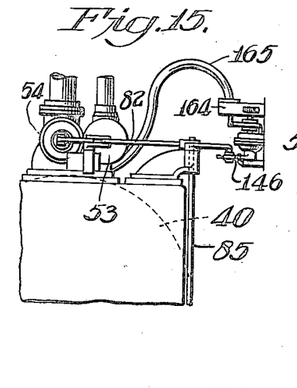
Figures 15, 16 and 17 are plan views showing a few of the many arrangements by which a clutch may be operated concurrently with application of fluid pressure to the tool, using fluid pressure for the clutch.
Figure 16:
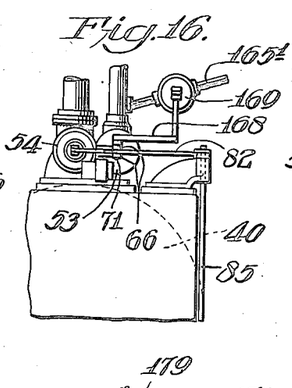
Figure 17:
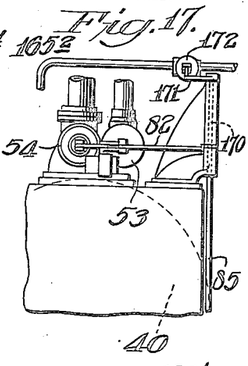

The fluid connections for clutch operation are variously shown in Figures 15, 16 and 17. In Figure 15 the clutch is operated by steam supplied through pipe 165, connected with the intensifier cylinder at the bottom directly, or with the steam inlet to the intensifier between the inlet valve and the intensifier cylinder; so as to be supplied with steam coincidently with application of steam to the intensifier cylinder.

In Figure 16 the pin 71 is rigidly connected with a bent operating arm 168 to open a valve 169 in a pipe 165' connecting directly with the intensifier steam pipe inlet but on the side of the inlet valve away from the intensifier.

In Figure 17 the rocker shaft 85 is extended beyond the arm 82, as at 170, to operate an additional rocker arm 171 by which a valve 172 is opened in a fluid supply pipe 165² connecting with a source of fluid supply wholly distinct from the steam for the intensifier. These various forms could be multiplied indefinitely.

Figure 18:
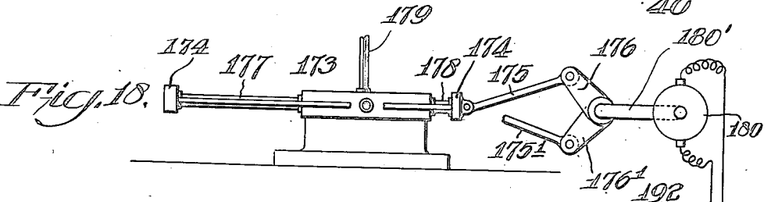
Figure 18 is a diagrammatic view showing an electrically set clutch for control of an electrically driven pressure pump.

In Figure 18 is a separate source of fluid supply for the hydraulic tool is shown in the pump 173 which is provided with two crossheads 174 operated through separate connecting rods 175, 175' from crank arms 176, 176' which are angularly displaced a quarter turn. Each pump is double-acting, having central cylinders and plungers 177, 178 entering from the ends. The fluid for the high pressure hydraulic tool operation is discharged from the pump through pipe 179.

The crank arms 176, 176' are driven through shaft 180' by motor 180 which may be supplied from any suitable source of electric energy shown diagrammatically at 181, 181'. A starting lever similar to that in Figures 1, 2, 6 and 8 may operate a train similar to that shown in Figures 6, 7 and Figure 11. The last, it will be noted, is shown from the opposite side as compared with the first two. In this case a weighted and properly guided rod 57' corresponding to 57 in Figure 11, may be used for contact making purposes, being connected electrically with one terminal 182 of a local circuit and carrying a contact 183 which is adapted to engage with a fixed contact 184 to complete the circuit. This local circuit contains a battery 185 and energizes a solenoid 186 as soon as the starting lever has moved. The circuit is likewise opened with either return movement of the starting lever or replacing movement of the parts through the automatic cut-off.

The solenoid core 187 is connected with a rod 188 which, when the solenoid is energized, performs two functions. It throws the yoke 158 to set a clutch shown as of the same character as that in Figure 12 and at the same time, through armature 189 it connects the terminal contacts 190, 190' from the source of energy 181, 181' with contacts 191, 191' supplying the electric motor 180 which drives the pump. The leads for the motor are shown at 192, 192'.

Figure 19:
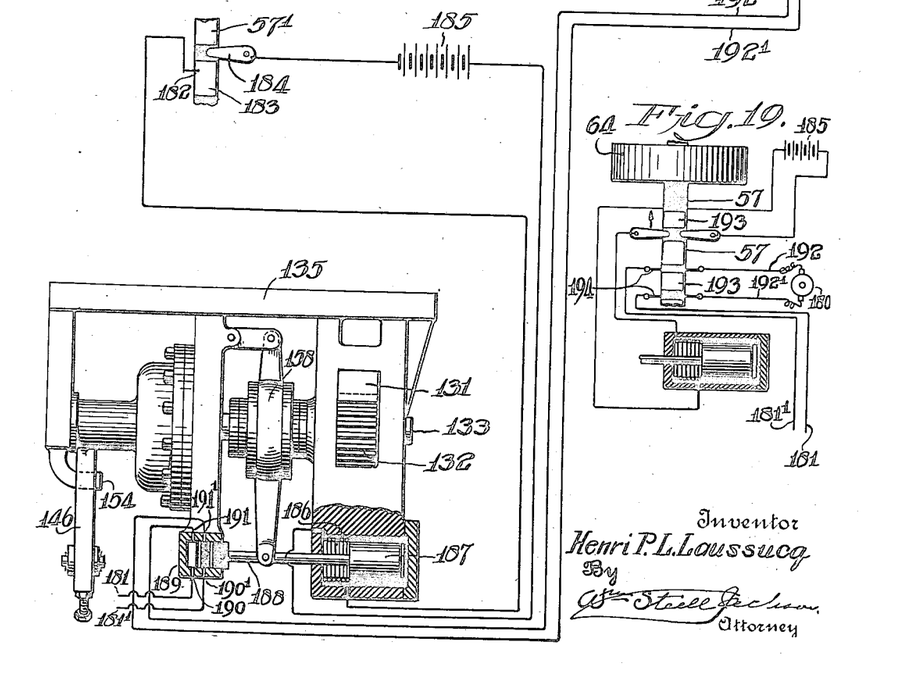
Figure 19 shows a modification of the structure seen in Figure 18.

In Figure 19 the local circuit is arranged as in Figure 18 but the clutch solenoid operates the clutch only. Separate contacts 193 on rod 57 cut the motor circuit in or out through brushes 194.

My reason for using the clutch-operating solenoid by preference to connect the source of energy 181, 181' with the pump motor, as in Figure 18, rather than to connect the source of energy 181, 181' directly through to the pump motor when the rod 57 is moved initially, as in Figure 19, is the advantage of avoiding energization of the motor when there is any failure of the clutch.

It will be evident that any form of clutch mechanism or setting mechanism for the beginning of the cut-off operation could be used with the shear or other hydraulic machinery having a fixed stroke.

Having thus described my invention, what I claim as new and desire to secure by Letters Patent is:

1. In high pressure hydraulic tool operation, an hydraulic tool adapted to be operated, a starting lever therefor and connections from said starting lever to control the source of fluid supply therefor, including a pair of connected floating arms and means operated from the tool for giving the arms a different character of movement from that given in hand operation to cut off the source of fluid supply.

2. In a high pressure hydraulic tool, a source of fluid pressure therefor, a hand lever and connections for applying the pressure, a pair of connected floating arms separate from the hand lever but one lever arm of which enters into the connections between the hand lever and the pressure inlet, and connections from another arm of said arms operated by the movable part of the tool to swing the pair of arms and close the pressure inlet automatically by movement of the tool.

3. In a high pressure hydraulic tool, a tool having a movable head, a source of fluid pressure therefor, a hand lever, a pair of floating connected arms whose pivot is shifted by the hand lever and connections from the floating arms for applying the pressure and automatic replacing devices moved by operation of the tool for shutting off the pressure with downward movement of the movable head of the tool.

4. In a high pressure hydraulic tool, a tool having a movable head, a source of fluid pressure therefor, a hand lever, a pair of floating connected arms separate from the hand lever and moved thereby, connections from the floating arms for applying the pressure and devices moved by operation of the tool for operating the floating arms to shut off the pressure with movement of the head of the tool.

5. In a high pressure hydraulic tool, a source of fluid pressure therefor, a tool having a movable head operated by the high pressure connections, a hand lever for applying the pressure, connections for the hand lever including a pair of floating connected arms bodily moved by the lever and means operated by the movable head for swinging said pair about its center, while the hand lever is still in opening position.

6. In a high pressure hydraulic tool, an intensifier having a low pressure cylinder, a pressure inlet valve therefor, a hand lever and connections for opening said pressure valve, a pair of floating connected arms whose pivot point is shifted by the hand lever, one lever arm of which enters into the connections between the hand lever and the pressure inlet and connections from another arm of said pair operated by the movable part of the tool to swing the pair of floating connected arms and close the pressure inlet automatically by movement of the tool.

7. In a high pressure hydraulic tool, a tool having a movable head, an intensifier having a low pressure cylinder, a pressure valve therefor, a hand lever, a pair of floating connected arms whose pivot is shifted by the hand lever and connections from the pair of floating connected arms for operating said pressure valve and automatic replacing devices moved by operation of the tool for shutting off the pressure with downward movement of the movable head of the tool.

8. In a high pressure hydraulic tool, an intensifier having a low pressure cylinder and high pressure connections, a tool having a movable head operated by the high pressure connections, a valve for said low pressure cylinder, a hand lever for opening the valve, connections between the hand lever and the valve including a bell crank giving movement of translation in the opening of the valve and means operated by the movable head for swinging said bell crank about a center to close the valve, while the hand lever is still in opening position.

9. In an intensifier-operated hydraulic tool, an intensifier having low pressure and high pressure cylinders, a tool and connections operated from the high pressure of the intensifier, pull-back connections for the tool, a valve for the low pressure cylinder, a hand lever, a pair of floating connected arms whose pivot is shifted by the hand lever, and connections from the pair of floating connected arms for operating the valve, a movable head on the tool and devices engaged by the head and adapted to alter the connections between the hand lever and the valve to close the valve when the hand lever is in valve-opening position.

10. In an intensifier-operated hydraulic tool, an intensifier having low pressure and high pressure cylinders, a tool having a movable head operated by the high pressure of the intensifier, a valve for the low pressure of the intensifier, a hand lever for the valve, connections between the hand lever and valve, including a bell crank capable of translation and oscillation to perform the same character of function in the connections and means operated by the head for moving the bell crank to give a different character of movement to said bell crank from that given by the hand lever and in reverse direction, to close the valve when the hand lever is in valve opening position.

11. In an intensifier-operated hydraulic tool, an intensifier having low and high pressure cylinders, a tool having a movable head operated by the high pressure thereof, a valve for the inlet of the low pressure cylinder, hand means including a hand lever and a pair of floating connected arms shifted bodily by the hand lever for opening said valve and automatic means operated by the head for turning the arms and closing the valve.

12. In an intensifier-operated hydraulic tool, an intensifier having high and low pressure cylinders, a tool having a movable head operated by the high pressure thereof, pull back provision for the head, inlet and exhaust valves for the low pressure cylinder, provision including a pair of connected arms for opening either valve with lost motion to leave the other valve unmoved, a hand lever and connections for opening either of said valves, one of said arms being translated by said lever and extending in the general direction of the hand lever, and in combination with tool-head-operated means for turning said arms about the lever to close the inlet valve with the hand lever in opening position therefor.

13. In an intensifier-operated hydraulic tool, an intensifier having high and low pressure cylinders, a tool having a movable head and a cylinder operated by the high pressure thereof, said head having a range of movement in excess of the range of movement given by said intensifier, a filling system for filling the cylinder, controlling the head until the intensifier pressure is to be applied, pull-back provision for lifting the head, an inlet valve for the low pressure of the intensifier, means for opening the inlet valve, automatic means operated by movement of the head for closing the inlet valve by reason of movement of the head and a clutch interposed between the head and the valve for engaging the parts to render said automatic means effective when the intensifier is applied.

14. In an intensifier-operated hydraulic tool, an intensifier having high and low pressure cylinders, a tool having a cylinder and a head moved thereby, operated from the high pressure thereof and having a range of movement in excess of that given by the high pressure thereof, a filling system for filling the cylinder through this additional range, a pull-back system for the head, an inlet valve for the low pressure cylinder, a hand lever, and a pair of floating connected arms controlled thereby for opening the valve and an adjustable closing device for the valve operated by the head of the tool through the arms and adapted to be preliminarily set for operation during the operation of the intensifier.

15. In an intensifier-operated hydraulic tool, a source of fluid pressure, a tool having a cylinder and a movable head operated therefrom, a hand lever, and a pair of floating connected arms controlled thereby for applying pressure, a cut-off therefor operating through the arms, and means for adjusting the range of movement of said tool head at which the cut-off becomes operative.

16. In an intensifier-operated hydraulic tool, an intensifier having high and low pressure cylinders, a tool having a cylinder and a movable head operated from the high pressure thereof and having a range of movement in excess of that given by the high pressure thereof, a filling system for filling the cylinder through this additional range, a pull-back system for the head, an inlet valve for the low pressure cylinder, a hand lever and a pair of floating connected arms controlled thereby for opening the valve, a closure for the valve operated by the head through the arms and means for adjusting the range of movement of said tool head at which the closure becomes operative.

17. In an intensifier-operated hydraulic tool, a source of fluid pressure, a tool having a movable head, a hand-lever for applying the pressure, a press-operated cut-off including a floating arm and valve-operating connection for throttling the pressure while the hand lever is in opening position, and an adjustment of the rate of speed of operation of said cut-off.

18. In an intensifier-operated hydraulic tool, an intensifier having high and low pressure cylinders, a tool having a movable head operated from the high pressure thereof and having a range of movement in excess of that given by the high pressure thereof, a filling system for filling the cylinder through this additional range, a pull-back system for the head, an inlet valve for the low pressure cylinder, a hand lever for opening the valve, a press-operated closure including a floating arm and valve-operating connection for shutting the valve while the hand lever is in opening position, and an adjustment of the rate of speed of operation of said closure.

19. In an intensifier-operated hydraulic tool, a source of high fluid pressure, a tool having a cylinder and a movable head having a range of movement much in excess of its required high pressure operation, a filling system for filling the cylinder through this additional range, a pull-back system for the head, a hand lever for applying the pressure and an automatic cut-off for the pressure while the hand lever is in operating position, actuated by the head, normally inoperative and set for operation by reason of movement of the hand lever.

20. In an intensifier-operated hydraulic tool, an intensifier having high and low pressure cylinders, a tool having a cylinder and a movable head operated from the high pressure thereof and having a range of movement in excess of that given by the high pressure thereof, a filling system for filling the cylinder through this additional range, a pull-back system for the head, an inlet valve for the low pressure cylinder, a hand lever for opening the valve and an automatic closure for the valve while the hand lever is in operating position, actuated by the head, normally inoperative and set for operation by reason of valve-opening movement of the hand lever.

21. In an intensifier-operated hydraulic tool, an intensifier having high and low pressure cylinders, a tool having a movable head operated from the high pressure thereof and having a range of movement in excess of that given by the high pressure, a filling system for filling the cylinder through this additional range, a pull-back system for the head, an inlet valve for the low pressure cylinder, a hand lever for opening the valve, a rack operative with the head, a gear turned by the rack, a closure for the valve and a clutch between the closure and gear operated by reason of movement of the hand lever.

22. In an intensifier-operated hydraulic tool, an intensifier having high and low pressure cylinders, the low-pressure being steam-operated, a tool having a cylinder and a movable head operated from the high pressure thereof and having a range of movement in excess of that given by the high pressure, a filling system for filling the tool cylinder through this additional range, a pull-back system for the head, an inlet valve for the low pressure cylinder, a hand lever for opening the valve, a normally inoperative closure for the valve, a clutch rendering the closure operative, a cylinder and piston for setting the clutch, and connections between the clutch cylinder and steam supply for operating the clutch when steam is applied to the low pressure.

23. In a fluid operated tool, an intensifier, hand operated inlet fluid pressure supply for the low pressure intensifier cylinder, an hydraulic tool operated by the intensifier, a rotary clutch member mounted adjacent the tool and rotated with tool movement, a second clutch member, normally at rest, connections from the second clutch member for shutting off the fluid supply from the low pressure intensifier cylinder, piston-operated means for joining the two clutch members and connections from the supply for the low pressure intensifier applied to the piston when the fluid is admitted to the intensifier.

24. In hydraulic tool operation, an hydraulic tool, a clutch secured in proximity to the tool, a source of fluid supply for operating the tool, mechanism connected with the tool moving one of the clutch members, a starting lever and connections for applying the fluid supply, and resetting connections from the other clutch member to cut off the fluid supply when the clutch is engaged.

25. In hydraulic tool operation, an hydraulic tool, a clutch member adapted to be rotated with movement of the tool, a second clutch member adapted to be rotated thereby when the clutch is engaged, means for engaging the two members, a starting lever and mechanism for the tool and connections between the second clutch member and the starting mechanism to stop the tool without shifting the starting lever.

26. In control mechanism for operating tools, a rotatable member, connections for turning it with movement of the tool, a clutch face terminal therefor, bearings supporting the rotatable member, a cooperating clutch face, connections adapted to shut off the power from the tool with operation of the second face and means for throwing the clutch to connect the faces.

27. In mechanism for shutting off a hand-started fluid operated tool, a clutch face and connected parts adapted to be rotated with movement of the tool, a co-operating clutch face normally at rest, adapted with a predetermined movement to shut off the tool and clutch-operating mechanism for engaging the two faces, put into play by the same source of energy as used to operate the tool.

28. In a tool-operated cut-off for energy initially applied to the tool by hand operation, a rotary member terminating in a clutch face, supports therefor, means for rotating this member with movement of the tool, a cooperating clutch member, supports therefor, connections from the second member to shut off the tool, a yoke, connections between the yoke and the first clutch member to apply the clutch, a longitudinally movable plunger connected with the yoke and connections from the source of energy for the tool for operating the plunger to set the clutch.

29. In a tool-operated cut-off for energy initially applied to the tool by hand operation, a rotary member terminating in a clutch face, supports therefor, means for rotating this member with movement of the tool, a cooperating clutch member, supports therefor, connections from the second member to shut off the tool, leaving the hand-operated lever in its set position, a yoke, connections between the yoke and the first clutch member to apply the clutch, a longitudinally movable plunger controlling the yoke and connections from the source of energy for the tool for operating the plunger to set the clutch.

HENRI P. L. LAUSSUCQ.